United States Patent Office 2,840,583
Patented June 24, 1958

2,840,583

HALOGEN AND DIHALOPHOSPHATO DERIVATIVES OF ACYLOXYALKENES

Joseph Donald Surmatis, Pompton Plains, N. J., assignor to Hoffmann-La Roche Inc., Nutley, N. J., a corporation of New Jersey No Drawing. Application December 23, 1952
Serial No. 327,663

14 Claims. (Cl. 260—403)

This invention relates to an improvement in the preparation of acyclic alcohols having a plurality of olefinic bonds and capable of existing in geometrically isomeric forms. The products of the invention are especially useful in the perfume industry and the pharmaceutical industry.

An important embodiment of the invention is a process which comprises treating a 1,3-diol having the Formula I with an organic acid esterifying agent containing the acyl radical R'CO— so as to replace the hydrogen atom of the terminal (or 1-) hydroxyl group of the diol by said acyl radical, reacting the resulting organic 1-ester of Formula II with an inorganic acid esterifying agent comprising a non-hydroxylic halogen-containing inorganic acid radical —Z so as to replace the 3-hydroxyl group of the organic ester by said non-hydroxylic halogen-containing acid radical, treating the resulting mixed organic-inorganic 1,3-diester of Formula III to eliminate therefrom the elements H and Z of the inorganic acid, and hydrolyzing or saponifying the resulting unsaturated organic 1-ester of Formula IV to produce the corresponding unsaturated 1-ol compound having the Formula V. This process can be represented graphically as follows:

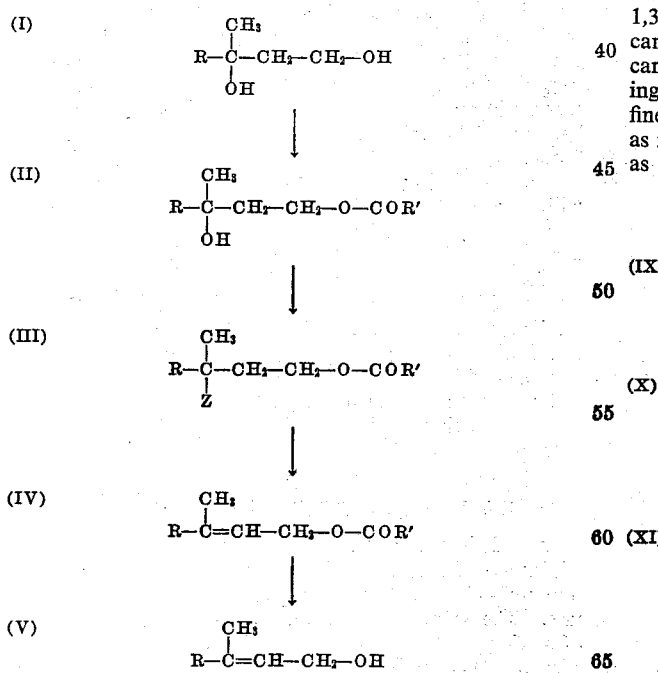

In the foregoing formulas, R represents a monovalent unsaturated acyclic hydrocarbon radical having at least six carbon atoms, preferably an alkenyl radical having at least six carbon atoms; the term "alkenyl" including both alka(mono)enyl and alka(poly)enyl radicals, i. e. monovalent acyclic hydrocarbon radicals containing one or more olefinic bonds. By way of illustration, R can represent any of the following radicals:

4-methyl-3-penten-1-yl

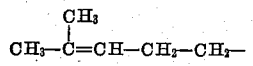

3,4-dimethyl-3-penten-1-yl

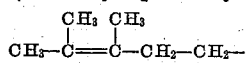

4-methyl-3,5-hexadien-1-yl

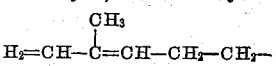

4,8-dimethyl-3,7-nonadien-1-yl

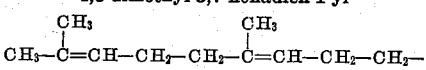

—COR' represents a carbonylic acyl radical of an organic carboxylic acid; preferably one in which R' represents a monovalent hydrocarbon radical, and still more preferably one in which R' represents an alkyl or monocyclic aryl hydrocarbon radical. That is, most preferably —COR' represents alkanoyl, such as acetyl or palmitoyl; or monocyclic hydrocarbon aroyl, such as benzoyl or toluoyl.

Z represents a monovalent non-hydroxylic halogen-containing acid radical of an inorganic acid, for example, a halo radical or a dihalophosphato radical.

Preferably the inorganic acid is selected from the class consisting of hydrochloric acid, hydrobromic acid and dichlorophosphoric acid, so that Z preferably represents chloro, bromo or dichlorophosphato.

A general procedure for making the 1,3-diols of Formula I, used herein as starting materials, comprises the steps of treating a ketone (Formula IX) by a Darzens reaction to produce the corresponding glycidic ester (Formula X), and reducing the latter (e. g. with lithium aluminum hydride or sodium and alcohol) to form the 1,3-diol (I), in some cases via the intermediate hydroxy-carboxylic acid ester of Formula XI. This procedure can be illustrated graphically as follows; R in the following formulas having the same meaning hereinabove defined, and R" signifying a radical (e. g. lower alkyl, such as methyl or ethyl, or monocyclic hydrocarbon aryl, such as phenyl) forming part of the ester group

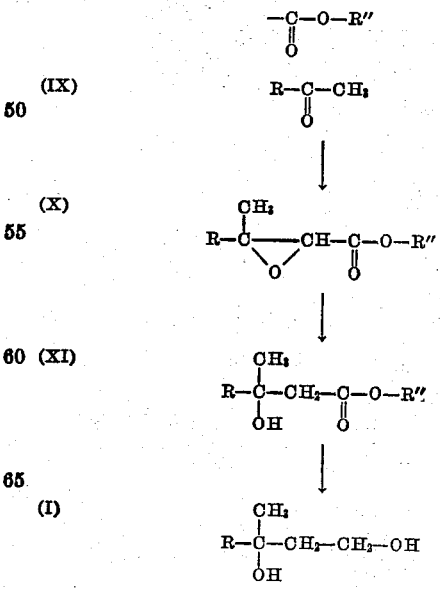

The 1,3-diol (I) is advantageously converted to the mixed ester (III) stepwise, first by reacting (I) with an approximately equimolar proportion of an acylating agent appropriate to introduce the desired organic carbonylic acyl radical R'CO—, such as an acid halide or an acid anhydride, e. g. acetyl chloride or palmitoyl chloride or benzoyl chloride or acetic anhydride; and then reacting the resulting organic 1-ester (II) with an approximately equimolar proportion of an inorganic acid esterifying agent appropriate to introduce the desired inorganic acid radical —Z, for example hydrochloric acid, hydrobromic acid, phosphorus oxychloride or phosphorus oxybromide-dichloride. The mixed organic-inorganic ester (III) is then treated to split out its inorganic acid content, i. e. H and Z, suitably by heating with an acid acceptor, e. g. a tertiary organic base such as pyridine, dimethylaniline or the like, or an inorganic base such as sodium bicarbonate.

By applying the procedures (IX)→(I) and (I)→(V), set forth above, to different starting materials falling within the general Formula IX, various multiply unsaturated alcohols of Formula V can be prepared. Thus, for example, by starting from the following starting materials of the class (IX)

(a) "Methylheptenone," i. e. 6-methyl-5-hepten-2-one
(b) "Dimethylheptenone," i. e. 5,6-dimethyl-5-hepten-2-one
(c) 6-methyl-5,7-octadien-2-one
(d) Geranylacetone, i. e. cis-6,10-dimethyl-5,9-undecadien-2-one the following multiply unsaturated alcohols can be prepared, respectively.

(a) $\Delta^{2,6}$-nerol
(b) $\Delta^{2,6}$-5-methyl-nerol
(c) 3,7-dimethyl-2,6,8-nonatrien-1-ol
(d) $\Delta^{6,7}$-cis-farnesol The successive products in the respective syntheses are tabulated below for convenience of visualization, the Roman numerals referring to the general formulas described hereinabove.

*Synthesis (a)*

(IX) 6-methyl-5-hepten-2-one
(X) 1-ester of 2,3-epoxy-3,7-dimethyl-6-octen-1-oic acid
(XI) 1-ester of 3,7-dimethyl-3-hydroxy-6-octen-1-oic acid
(I) 3,7-dimethyl-6-octen-1,3-diol
(II) 1-acyloxy-3-hydroxy-3,7-dimethyl-6-octene (III) 1-acyloxy-3-{chloro or bromo or dichlorophosphato}-3,7-dimethyl-6-octene (IV) 1-acyloxy-3,7-dimethyl-2,6-octadiene
(V) 3,7-dimethyl-2,6-octadien-1-ol

*Synthesis (b)*

(IX) 5,6-dimethyl-5-hepten-2-one
(X) 1-ester of 2,3-epoxy-3,6,7-trimethyl-6-octen-1-oic acid
(XI) 1-ester of 3,6,7-trimethyl-3-hydroxy-6-octen-1-oic acid
(I) 3,6,7-trimethyl-6-octen-1,3-diol
(II) 1-acyloxy-3-hydroxy-3,6,7-trimethyl-6-octene (III) 1-acyloxy-3-{chloro or bromo or dichlorophosphato}-3,6,7-trimethyl-6-octene (IV) 1-acyloxy-3,6,7-trimethyl-2,6-octadiene
(V) 3,6,7-trimethyl-2,6-octadien-1-ol

*Synthesis (c)*

(IX) 6-methyl-5,7-octadien-2-one
(X) 1-ester of 2,3-epoxy-3,7-dimethyl-6,8-nonadien-1-oic acid
(XI) 1-ester of 3,7-dimethyl-3-hydroxy-6,8-nonadien-1-oic acid
(I) 3,7-dimethyl-6,8-nonadien-1,3-diol
(II) 1-acyloxy-3-hydroxy-3,7-dimethyl-6,8-nonadiene (III) 1-acyloxy-3-{chloro or bromo or dichlorophosphato}-3,7-dimethyl-6,8-nonadiene (IV) 1-acyloxy-3,7-dimethyl-2,6,8-nonatriene
(V) 3,7-dimethyl-2,6,8-nonatrien-1-ol

*Synthesis (d)*

(IX) 6,10-dimethyl-5,9-undecadien-2-one
(X) 1-ester of 2,3-epoxy-3,7,11-trimethyl-6,10-dodecadien-1-oic acid
(XI) 1-ester of 3,7,11-trimethyl-3-hydroxy-6,10-dodecadien-1-oic acid
(I) 3,7,11-trimethyl-6,10-dodecadien-1,3-diol
(II) 1-acyloxy-3-hydroxy-3,7,11-trimethyl-6,10-dodecadiene (III) 1-acyloxy-3-{chloro or bromo or dichlorophosphato}-3,7,11-trimethyl-6,10-dodecadiene (IV) 1-acyloxy-3,7,11-trimethyl-2,6,10-dodecatriene
(V) 3,7,11-trimethyl-2,6,10-dodecatrien-1-ol The starting materials (a), (b) and (d), of general Formula IX referred to above, i. e. methylheptenone, dimethylheptenone and geranylacetone, are well known compounds, the preparation of which need not be described to those skilled in the art. As for the remaining starting material (c), i. e. 6-methyl-5,7-octadien-2-one, its preparation will be apparent to those skilled in the art from the following description:

3-methyl-1-penten-4-yn-3-ol is catalytically hydrogenated in the presence of a palladium-lead catalyst to produce 3-methyl-1,4-pentadien-3-ol; the latter is treated with phosphorus tribromide (undergoing rearrangement) to yield 1-bromo-3-methyl-2,4-pentadiene, and the latter reacted in an acetoacetic ester condensation, followed by ketonic hydrolysis, to produce 6-methyl-5,7-octadien-2-one.

Some variations in the procedures described herein will be advantageous in particular cases. For example, the separate formation and isolation of the hydroxycarboxylic acid ester (XI) can be dispensed with, if desired. Other procedures equivalent to those detailed herein will be obvious to persons skilled in the art. Accordingly, it should be understood that the invention is not limited to the processes specifically described for purposes of illustration.

The invention is further disclosed in the following examples, which are likewise illustrative but not limitative thereof:

EXAMPLE 1

*Ethyl 2,3-epoxy-3,7-dimethyl-6-octen-1-oate*

In a 3-liter, 3-necked flask fitted with a mechanical stirrer and a thermometer, there were charged 504 g. of 6-methyl-5-hepten-2-one and 613 g. of ethyl chloroacetate. The solution was cooled to —10° C. and 270 g. of sodium methylate was added in small portions while stirring. The addition required four hours. The temperature of the reaction mixture was not allowed to exceed 0° C. After all of the sodium methylate was added, the cooling bath was removed and the stirring was continued until room temperature was reached. The mixture was washed twice with 1 liter of water and distilled over a column of 10 theoretical plates. There was obtained 680 g. of ethyl 2,3-epoxy-3,7-dimethyl-6-octen-1-oate distilling at 84° C./1 mm.; $n_D^{25}=1.4530$.

EXAMPLE 2

*3,7-dimethyl-6-octene-1,3-diol (two-step reduction)*

In a 12-liter flask which was fitted with an efficient condenser and a stirrer, there were placed 5 liters of ethyl alcohol, 450 cc. of glacial acetic acid and 212 g. of ethyl 2,3-epoxy-3,7-dimethyl-6-octen-1-oate. Metallic sodium, 92 g., was cut up into small pieces of approximately ¼" diameter and added in small portions over a period of one hour. At the end of this period, the reaction mixture was filtered to remove the crystallized sodium acetate. The solvent was removed by distillation under vacuum, then the residue was water-washed and distilled. The product, ethyl 3,7-dimethyl-3-hydroxy-6-octen-1-oate, distilled at 102° C./1 mm., $n_D^{25}=1.455$.

A solution of 107 g. of ethyl 3,7-dimethyl-3-hydroxy-6-octen-1-oate in 500 cc. of ethyl ether was slowly added to 13 g. of lithium aluminum hydride powder suspended in 500 cc. of ether. The temperature was controlled at −5° C. during the addition, which required 2 hours. Stirring was continued for four more hours. The excess lithium aluminum hydride was cautiously decomposed with water; then the solution was acidified with 5 percent sulfuric acid. The oil layer was water-washed and distilled. The product, 3,7-dimethyl-6-octene-1,3-diol, had $n_D^{25}=1.473$.

EXAMPLE 3

*3,7-dimethyl-6-octene-1,3-diol (one-step reduction)*

(a) A 12-liter, 3-necked flask was fitted with two efficient coil reflux condensers. Five liters of n-butyl alcohol and 424 g. (2 mols) of ethyl 2,3-epoxy-3,7-dimethyl-6-octen-1-oate were placed in the flask. Metallic sodium, 360 g., was cut into approximately one-gram cubes and added all at once to the reaction flask. When the reaction rate slowed down, heat was applied to maintain a steady reflux until all of the sodium was reacted. The reaction mixture was cooled and washed twice, each time with 1 liter of water. Then solid $CO_2$ was added to the dark brown solution to neutralize the caustic. The solution was again washed twice with 1 liter of water. The butyl alcohol was distilled off at 100 mm. The product, 3,7-dimethyl-6-octene-1,3-diol, distilled at 114° C./0.1 mm., $n_D^{25}=1.473$, as a colorless viscous oil.

(b) To a solution of 15.7 g. of lithium aluminum hydride in 500 cc. of ethyl ether there was added 106 g. of ethyl 2,3-epoxy-3,7-dimethyl-6-octen-1-oate in 200 cc. of ether at −10° to −15° C. in two hours. During this time a heavy deposit of a gelatinous material was obtained. The stirring was continued for an additional 3 hours while the temperature was allowed to rise to 25° C. Then 50 cc. of ethyl acetate was stirred in to decompose any excess reducing agent. After stirring for 30 minutes, the reaction mixture was poured into a mixture of 150 cc. of hydrochloric acid and 500 g. of ice. This was stirred until the ice dissolved, and then the ether layer was separated and water-washed. On removing the solvent and fractionating the residue, a high yield of 3,7-dimethyl-6-octene-1,3-diol was obtained, B. P. 110°–120° C./0.1 mm.; $n_D^{20}=1.468–1.472$.

EXAMPLE 4

*1-acetoxy-3-hydroxy-3,7-dimethyl-6-octene*

172 g. of 3,7-dimethyl-6-octene-1,3-diol was placed in a flask equipped with a stirrer, thermometer and dropping funnel. 500 cc. of petroleum naphtha ("Skelly-solve B") and 200 cc. of dimethylaniline were added to the flask and the contents were cooled to −10° C. by means of an acetone Dry-Ice bath. Then a solution of 97 cc. of acetyl chloride in 100 cc. of petroleum naphtha was added dropwise to the reaction mixture, while stirring, at such a rate that the internal temperature of the reaction mixture did not exceed −5° C. Two hours were required for the addition. At the end of this time, the cooling bath was removed and stirring was continued for two hours more. The reaction mixture was washed twice, each time with 500 cc. of water. The solvent was removed by distillation under water vacuum, and the residue was distilled under high vacuum. The product, 1-acetoxy-3-hydroxy-3,7-dimethyl-6-octene, distilled at 102°–105° C./0.5 mm., $n_D^{25}=1.460$.

EXAMPLE 5

*1-acetoxy-3-dichlorophosphato-3,7-dimethyl-6-octene*

In a flask equipped with a stirrer, condenser, thermometer and dropping funnel were placed 200 cc. of toluene, 80 cc. of pyridine and 50 cc. of phosphorus oxychloride. 107 g. of 1-acetoxy-3-hydroxy-3,7-dimethyl-6-octene (product of Example 4), dissolved in 100 cc. of toluene, was added dropwise over a period of 30 minutes. The solution of the 1-acetoxy-3-dichlorophosphato-3,7-dimethyl-6-octene formed was used directly for the procedure described in Example 6.

EXAMPLE 6

*1-acetoxy-3,7-dimethyl-2,6-octadiene*

The reaction flask containing the product of Example 5 was heated on a water bath to a temperature of 95°–100° C. and maintained thereat for one hour while stirring. The reaction mixture was then cooled to 40° C. and 500 cc. of cold water was added. The mixture was shaken for 5 minutes and then allowed to separate into layers. The oil layer was removed and washed twice, each time with 500 cc. of water. The solvent was removed by distillation at 100 mm. pressure, and the residue was distilled in high vacuo. The product, 1-acetoxy-3,7-dimethyl-2,6-octadiene, distilled at 110° C./8 mm.; $n_D^{20}=1.456$.

EXAMPLE 7

*3,7-dimethyl-2,6-octadien-1-ol*

To a solution of 275 g. of trans-1-acetoxy-3,7-dimethyl-2,6-octadiene in 800 cc. of ethyl alcohol was added a solution of 100 g. of potassium hydroxide dissolved in 200 cc. of water. The temperature rose to about 45° C. The mixture was stirred for four hours, allowing the temperature to drop to about 25° C. The reaction mixture was then diluted with 1 liter of water, and allowed to settle into layers. The oil layer was separated, and the water layer was extracted twice, each time with 500 cc. of benzene. The combined benzene extracts were added to the above mentioned oil layer, and the combined liquids were washed with water until neutral to litmus. After drying, the solvent was evaporated and the residue fractionated under reduced pressure. The fraction boiling at 89°–92° C./3 mm., $n_D^{25}=1.472$, was identified as 3,7-dimethyl-2,6-octadien-1-ol. The diphenylurethane melted at 52°–54° C. (corrected). The allophanate melted at 101° C. (corrected).

EXAMPLE 8

*1-benzoyloxy-3-hydroxy-3,7-dimethyl-6-octene*

To a mixture of 111 g. of 3,7-dimethyl-6-octene-1,3-diol, 400 cc. of petroleum naphtha and 130 cc. of pyridine, cooled to −10° C. as described in Example 1, was added 95 cc. of benzoyl chloride at such a rate that the internal temperature did not exceed 0° C. One hour was required. The cooling bath was removed and stirring was continued until the temperature rose to 20° C. The reaction mixture was washed with water and the solvent was distilled off. The residue was distilled in vacuo to yield 1-benzoyloxy-3-hydroxy-3,7-dimethyl-6-octene, B. P. 155°–160° C./0.2 mm., $n_D^{25}=1.516–1.517$.

EXAMPLE 9

*1-benzoyloxy-3-dichlorophosphate-3,7-dimethyl-6-octene*

In a flask equipped with a stirrer, condenser, thermometer and dropping funnel were placed 200 cc. of toluene, 600 cc. of pyridine and 100 cc. of phosphorus oxychloride. 86 g. of 1-benzoyloxy-3-hydroxy-3,7-dimethyl-6-octene (product of Example 8), dissolved in 100 cc. of toluene, was added dropwise over a period of 30 minutes. The solution of the 1-benzoyloxy-3-dichlorophosphato-3,7-dimethyl-6-octene formed was used directly for the procedure described in Example 10.

EXAMPLE 10

*1-benzoyloxy-3,7-dimethyl-2,6-octadiene*

The reaction flask containing the product of Example 9 was heated on a water bath to a temperature of 95°–100° C. and was maintained at that temperature for two hours while stirring. The reaction mixture was then cooled and washed three times, each time with 1 liter of water. The washed organic material was distilled to remove the solvent and then fractionated in vacuo. The product, 1-benzoyloxy-3,7-dimethyl-2,6-octadiene, distilled at 150°–160° C./0.4 mm.;

$$n_D^{20} = 1.510 - 1.518$$

This product, on saponification with potassium hydroxide by a procedure similar to that described in Example 7, yielded 3,7-dimethyl-2,6-octadien-1-ol.

EXAMPLE 11

*1-acetoxy-3-bromo-3,7-dimethyl-6-octene*

50 g. of 1-acetoxy-3-hydroxy-3,7-dimethyl-6-octene (product of Example 4) was dissolved in 250 cc. of methylene chloride and cooled to −15° C. Then 150 cc. of 48 percent aqueous hydrobromic acid was added, all at once, and the mixture was stirred, allowing the temperature to rise to 20° C. The oil layer was separated and washed once with 200 cc. of water. The solution of the 1-acetoxy-3-bromo-3,7-dimethyl-6-octene thus obtained was used directly for the procedure described in Example 12.

EXAMPLE 12

*1-acetoxy-3,7-dimethyl-2,6-octadiene*

To the washed oil layer obtained as the product of Example 11 above was added a solution of 50 g. of sodium bicarbonate in 500 cc. of water. The reaction mixture was heated at gentle reflux, with stirring, until the evolution of carbon dioxide ceased. Then the methylene chloride was distilled off while stirring, and then stirring was continued for an additional two hours at 60° C. The residue was distilled in vacuo. The product, 1-acetoxy-3,7-dimethyl-2,6-octadiene, distilled at 85°–90° C./2 mm., $n_D^{25} = 1.4570 - 1.4575$.

EXAMPLE 13

*1-palmitoyloxy-3-hydroxy-3,7-dimethyl-6-octene*

100 g. of 3,7-dimethyl-6-octene-1,3-diol, 117 cc. of pyridine and 500 cc. of petroleum naphtha were placed in a flask equipped with a stirrer, thermometer, condenser and dropping funnel and cooled to −10° C. To this solution was added 170 g. of palmitoyl chloride over a period of one hour, while stirring, at such a rate that the temperature did not rise above 0° C. After the addition was completed, stirring was continued for two hours more. The reaction mixture was then washed with water and the solvent was distilled off. The residue was essentially 1-palmitoyloxy - 3 - hydroxy-3,7-dimethyl-6-octene, $n_D^{25} = 1.4630$.

EXAMPLE 14

*1-palmitoyloxy-3-dichlorophosphato-3,7-dimethyl-6-octene*

58 cc. of phosphorus oxychloride, 240 cc. of pyridine and 200 cc. of toluene were placed in a flask equipped with a stirrer, condenser, thermometer and dropping funnel. To the reaction mixture was added dropwise 239 g. of 1 - palmitoyloxy - 3 - hydroxy-3,7-dimethyl-6-octene (product of Example 13) over a period of three hours, at such a rate that the temperature did not exceed 40° C. The solution of 1-palmitoyloxy-3-dichlorophosphato-3,7-dimethyl-6-octene formed was used directly for the procedure described in Example 15.

EXAMPLE 15

*1-palmitoyloxy-3,7-dimethyl-2,6-octadiene*

The reaction flask containing the product of Example 14 was heated on a water bath at 95°–100° C. for two hours. After cooling to +5° C., 500 cc. of water was added slowly to decompose the excess phosphorus oxychloride. The oil layer was separated and washed three times with 250 cc. portions of water. The solvent was distilled off. The residue was essentially 1-palmitoyloxy-3,7-dimethyl-2,6-octadiene, $n_D^{25} = 1.4668$.

EXAMPLE 16

*3,7-dimethyl-2,6-octadien-1-ol*

220 g. of 1-palmitoyloxy-3,7-dimethyl-2,6-octadiene was dissolved in 1 liter of ethanol. To the solution at room temperature was added 195 g. of potassium hydroxide dissolved in 500 cc. of water, and the reaction mixture was stirred well for two hours. Then 1 liter of water was added and the mixture was extracted with petroleum naphtha. Removal of the latter and fractionation in vacuo yielded 3,7-dimethyl-2,6-octadien-1-ol, B. P. 63° C./0.4 mm.; $n_D^{25} = 1.4737$.

EXAMPLE 17

*1-acetoxy-3-chloro-3,7-dimethyl-6-octene*

54 g. of 1-acetoxy-3-hydroxy-3,7-dimethyl-6-octene (product of Example 4) was dissolved in 100 cc. of methylene chloride and cooled to −15° C. Then 400 cc. of 38 percent aqueous hydrochloric acid was added all at once, while stirring; stirring was continued for 10 minutes, during which time the temperature rose to 29° C. The aqueous and oil layers were separated, the aqueous layer was extracted with 50 cc. of methylene chloride, and the extract was added to the oil layer. The combined liquids were water washed and the methylene chloride was distilled off under water vacuum. The product, which was essentially 1-acetoxy-3-chloro-3,7-dimethyl-6-octene, was used without further purification for the procedure of Example 18.

EXAMPLE 18

*1-acetoxy-3,7-dimethyl-2,6-octadiene*

To the crude product of Example 17 above, was added 50 cc. of toluene and 50 cc. of pyridine. The reaction mixture was heated at 95° C. on a water bath and maintained thereat for two hours while stirring. At the end of this time, the reaction mixture was cooled, washed with water, and the solvent was distilled off under water vacuum. The residue was distilled under high vacuum. The product, 1-acetoxy-3,7-dimethyl-2,6-octadiene, had an index of refraction $n_D^{25} = 1.4572$.

EXAMPLE 19

*Ethyl 2,3-epoxy-3,6,7-trimethyl-6-octen-1-oate*

In a two-liter 3-necked flask, there were placed 200 g. of 5,6-dimethyl-5-hepten-2-one, 310 cc. of ethyl chloroacetate and 500 cc. of toluene. The mixture was cooled to −30° C. and 151 g. of sodium methylate were slowly added so that the reaction temperature remained between —5 and —10° C. One hour was required to complete the addition. The reaction mixture was then stirred at —5° C. for two hours under nitrogen. The resulting reaction mixture was water washed and the solvent removed under vacuo. The product, ethyl 2,3-epoxy-3,6,7-trimethyl-6-octen-1-oate, distilled at 97° C./1.3 mm., $n_D^{25}=1.458$.

EXAMPLE 20

3,6,7-trimethyl-6-octen-1,3-diol

A solution of 225 g. of ethyl 2,3-epoxy-3,6,7-trimethyl-6-octen-1-oate in one liter of ethyl ether was slowly added to a stirred suspension of 38 g. of lithium aluminum hydride in one liter of ether. The temperature was controlled at +5 to —10° C. during the addition. Three hours were required. Stirring was then continued for four more hours. The excess lithium aluminum hydride was cautiously decomposed with water; then the mixture was acidified with 5 percent sulfuric acid. The oil layer was separated, water washed and the ether removed by distillation. The product, 3,6,7-trimethyl-6-octen-1,3-diol, had $n_D^{25}=1.475$.

EXAMPLE 21

1-acetoxy-3-hydroxy-3,6,7-trimethyl-6-octene

To a 3-necked flask there were charged 85 g. of 3,6,7-trimethyl-6-octen-1,3-diol, 116 cc. of pyridine, and 500 cc. of petroleum ether ("Skellysolve B"). To this there were added in one hour, at 0° to —5° C., 34 cc. of acetyl chloride. The mixture was allowed to stir for an additional 3 hours. At the end of this period, the reaction mixture was washed with water and the solvent removed at reduced pressure. The product, 1-acetoxy-3-hydroxy-3,6,7-trimethyl-6-octene, distilled at 102°–108° C./0.3 mm.; $n_D^{25}=1.465$.

EXAMPLE 22

1-acetoxy-3-dichlorophosphato-3,6,7-trimethyl-6-octene

To a 3-necked flask equipped with a stirrer, thermometer and reflux condenser there were charged 35.5 cc. of phosphorus oxychloride, 122 cc. of pyridine and 100 cc. of toluene. From a dropping funnel there were added 81 g. of 1-acetoxy-3-hydroxy-3,6,7-trimethyl-6-octene in one-half hour. The solution of the product, 1-acetoxy-3-dichlorophosphato-3,6,7-trimethyl-6-octene, was used directly for the procedure described in Example 23.

EXAMPLE 23

1-acetoxy-3,6,7-trimethyl-2,6-octadiene

The reaction flask containing the product of Example 22 was heated on a water bath at 95–100° C. for two hours. After cooling to room temperature, the excess of phosphorus oxychloride was decomposed with water. The aqueous layer was extracted with toluene, and the toluene extract was washed with water. The solvent was removed by low pressure distillation, and the residue fractionated in vacuo. The product, 1-acetoxy-3,6,7-trimethyl-2,6-octadiene, distilled at 70°–73° C./0.3 mm.; $n_D^{25}=1.464$.

EXAMPLE 24

3,6,7-trimethyl-2,6-octadien-1-ol

In a 1-liter flask fitted with a mechanical stirrer, there were placed 210 g. of 1-acetoxy-3,6,7-trimethyl-2,6-octadiene along with 600 cc. of 95 percent ethyl alcohol. Potassium hydroxide, 75 g., was dissolved in 150 cc. of water and cooled to room temperature. The caustic solution was poured into the reaction flask and the solution was stirred at 40°–50° C. for four hours. One liter of cold water was added. The oil layer was removed while the aqueous portion was extracted with 500 cc. of benzene. The combined oil layers were combined, water washed and distilled. The 3,6,7-trimethyl-2,6-octadien-1-ol which was obtained boiled at 66° C./0.2 mm., $n_D^{25}=1.479$.

EXAMPLE 25

Ethyl 2,3-epoxy-3,7,11-trimethyl-6,10-dodecadien-1-oate

In a 3-necked flask fitted with a stirrer and thermometer there were charged 194 g. of geranylacetone and 183 g. of ethyl chloroacetate. The solution was cooled to —10° C. and 81 g. of sodium methylate were added while stirring. The addition required four hours and the temperature of the reaction mixture was not allowed to exceed 0° C. Then the mixture was stirred an additional hour while allowing it to reach room temperature. The mixture was washed twice, each time with 500 cc. of water. The product, ethyl 2,3-epoxy-3,7,11-trimethyl-6,10-dodecadien-1-oate, boiled at 130° C./0.6 mm.; $n_D^{52}=1.4710$.

EXAMPLE 26

3,7,11-trimethyl-6,10-dodecadien-1,3-diol

In a 3-necked flask equipped with a stirrer, thermometer and condenser there were charged 12.2 g. of lithium aluminum hydride and 400 cc. of ethyl ether. To the stirred slurry there was added dropwise a solution of 100 g. of ethyl 2,3-epoxy-3,7,11-trimethyl-6,10-dodecadien-1-oate in 600 cc. of ethyl ether. The addition took two hours, during which time the temperature was maintained at 0° to —5° C. by means of an alcohol-"Dry Ice" bath. The mixture was stirred four more hours while allowing the temperature to rise to 20° C. Excess lithium aluminum hydride was decomposed, first with ethyl acetate, then with water. An excess of 5 percent sulfuric acid solution was added. The mixture was separated and washed until neutral. The product, 3,7,11-trimethyl-6,10-dodecadien-1,3-diol, had $n_D^{25}=1.484$.

EXAMPLE 27

1-acetoxy-3-hydroxy-3,7,11-trimethyl-6,10-dodecadiene

In a 3-necked flask fitted with stirrer, thermometer and dropping funnel there were charged 90 g. of 3,7,11-trimethyl-6,10-dodecadien-1,3-diol, 48 cc. of pyridine and 300 cc. of petroleum ether. The solution was cooled to —10° C. From a dropping funnel there was added, in 30 minutes, 29.5 cc. of acetyl chloride, while maintaining the temperature at —5° C. to 0° C. The mixture was stirred one hour longer while allowing the temperature to rise to 20° C. The reaction mixture was washed twice, each time with 250 cc. of water. After removal of the solvent, the product, 1-acetoxy-3-hydroxy-3,7,11-trimethyl-6,10-dodecadiene, distilled at 145°–150° C./0.7 mm.; $n_D^{25}=1.473$.

EXAMPLE 28

1-acetoxy-3-dichlorophosphato-3,7,11-trimethyl-6,10-dodecadiene

In a 3-necked flask fitted with a stirrer, condenser and dropping funnel there were placed 28 cc. of phosphorus oxychloride, 149 cc. of pyridine, and 65 cc. of toluene. To the stirred mixture there was added 78 g. of 1-acetoxy-3-hydroxy-3,7,11-trimethyl-6,10-dodecadiene in 50 cc. of toluene in 30 minutes. The product, 1-acetoxy-3-dichlorophosphato - 3,7,11-trimethyl-6,10 - dodecadiene, was used directly for the process of Example 29.

EXAMPLE 29

1-acetoxy-3,7,11-trimethyl-2,6,10-dodecatriene

The reaction flask containing the product of Example 28 was stirred at 95°–100° C. for two hours. After cooling to room temperature, excess phosphorus oxychloride was cautiously decomposed with water. The oil layer was separated and washed twice, each time with 250 cc. of water. The solvent was removed under reduced pressure and the product, 1-acetoxy-3,7,11-trimethyl-2,6,10-dodecatriene, distilled at 115°–125° C./0.3 mm.; $n_D^{25}=1.476$.

EXAMPLE 30

3,7,11-trimethyl-2,6,10-dodecatrien-1-ol

In a 3-necked flask fitted with a stirrer and thermometer there were charged 50 g. of 1-acetoxy-3,7,11-trimethyl-2,6,10-dodecatriene and 250 cc. ethanol. A solution of 33 g. of potassium hydroxide in 300 cc. of water was added over a period of one-half hour to the stirred alcohol solution, the temperature being kept below 40° C. Then the mixture was stirred three hours at room temperature. 500 cc. of water was added and the mixture was extracted three times, each time with 250 cc. of petroleum ether. After removal of the solvent, the product, $\Delta^{2,3}$-trans-$\Delta^{6,7}$-cis-3,7,11-trimethyl-2,6,10-dodecatrien-1-ol, distilled at 117°–118° C./0.5 mm.; $n_D^{25}=1.4870$.

This application is a continuation-in-part of my copending application Serial No. 275,215, filed March 6, 1952, now abandoned.

I claim:

1. A mixed organic-inorganic ester of the formula

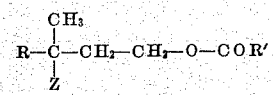

wherein R represents an alkenyl radical having at least six carbon atoms selected from the class consisting of alka(mono)enyl and alka(di)enyl radicals, —COR' represents an acyl radical selected from the group consisting of alkanoyl and monocyclic hydrocarbon aroyl, and —Z represents an inorganic acid radical selected from the group consisting of chloro, bromo and dichlorophosphato.

2. A compound according to claim 1 in which R is an alka(mono)enyl radical.

3. A compound according to claim 1 in which R is an alka(di)enyl radical.

4. A compound according to claim 1 in which Z is chloro.

5. A compound according to claim 1 in which Z is bromo.

6. A compound according to claim 1 in which Z is dichlorophosphato.

7. A compound according to claim 1 in which R is 4-methyl-3-penten-1-yl.

8. A compound according to claim 1 in which R is 3,4-dimethyl-3-penten-1-yl.

9. A compound according to claim 1 in which R is 4,8-dimethyl-3,7-nonadien-1-yl.

10. 1 - acyloxy-3 - dichlorophosphato - 3,7 - dimethyl-6-octene.

11. 1-acyloxy-3 - dichlorophosphato - 3,6,7-trimethyl-6-octene.

12. 1-acyloxy-3 - dichlorophosphato - 3,7,11 - trimethyl-6,10-dodecadiene.

13. 1-acyloxy-3-chloro-3,7-dimethyl-6-octene.

14. 1-acyloxy-3-chloro-3,6,7-trimethyl-6-octene.

References Cited in the file of this patent

UNITED STATES PATENTS

| | | |
|---|---|---|
| 1,945,183 | Clemmensen | Jan. 30, 1934 |
| 2,467,330 | Milas | Apr. 12, 1949 |
| 2,609,388 | Knapp et al. | Sept. 2, 1952 |
| 2,610,207 | Lindlar et al. | Sept. 9, 1952 |
| 2,677,701 | Surmatis et al. | May 4, 1954 |

OTHER REFERENCES

Chem. Abst., vol. 27, page 270 [2].
Whitmore: Organic Chem., 1937 ed., pages 82–83.
Fieser and Fieser: Organic Chem., 1944, p. 58–151.